Figure 5:
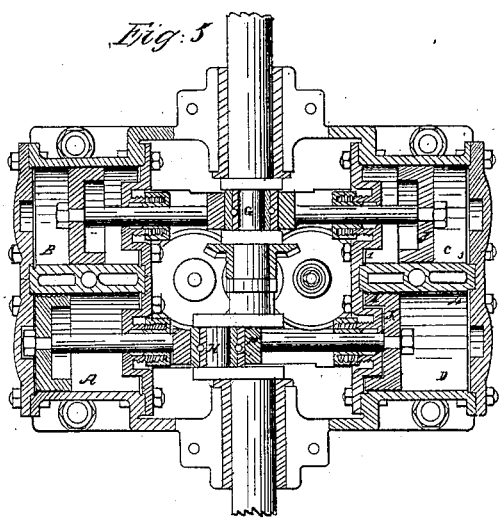

Sheet 1-4 Sheets.
R. F. Hatfield,
Reciprocating Steam Engine,
N° 56,045.    Patented July 3, 1866.
Fig: 1
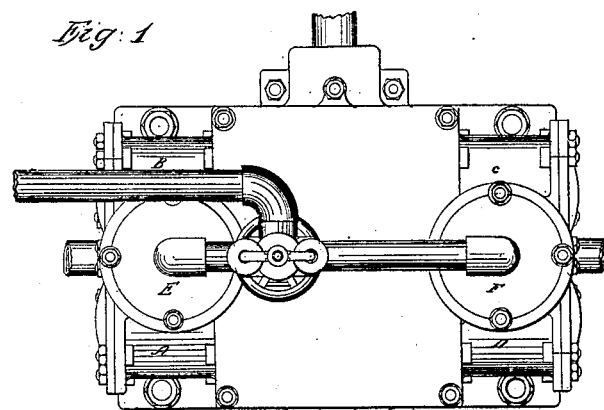
Fig: 2
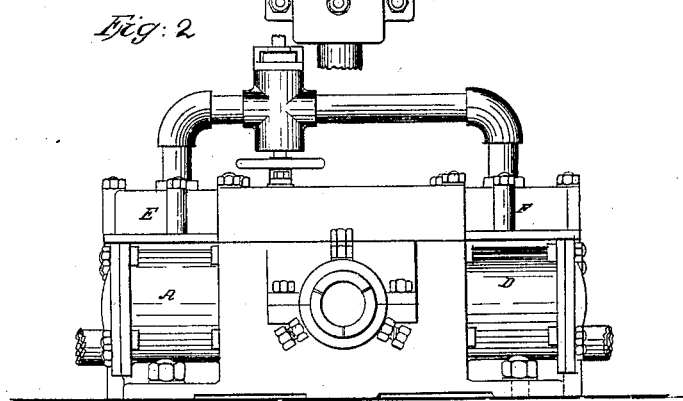
Fig: 3
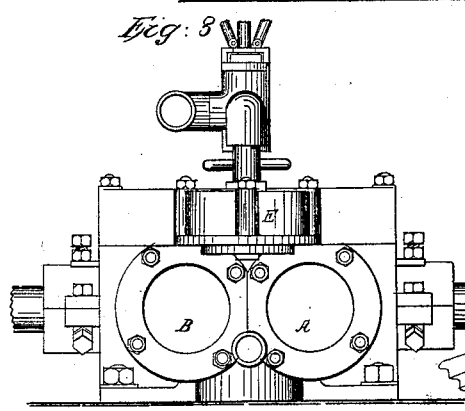
Fig: 4
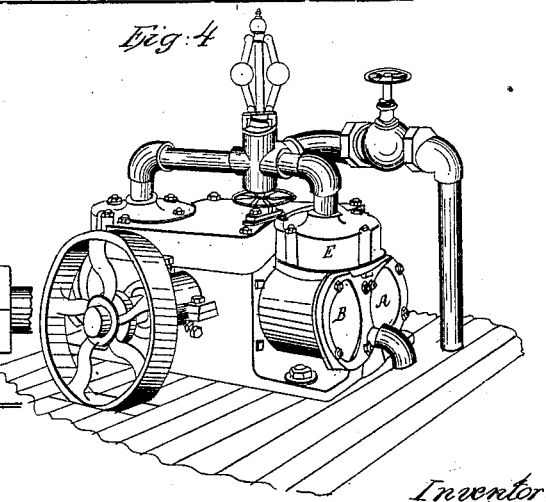
Witnesses:
A. Remer
J. E. Ware
Inventor:
R. F. Hatfield R. F. Hatfield,
Reciprocating Steam Engine,
N° 56,045. Sheet 2-4 Sheets. Patented July 3, 1866.

Witnesses:
Inventor:
R. F. Hatfield

R. F. Hatfield,
Reciprocating Steam Engine,
No. 56,045. Patented July 3, 1866.
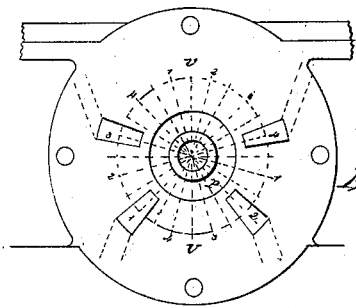
Fig. 9
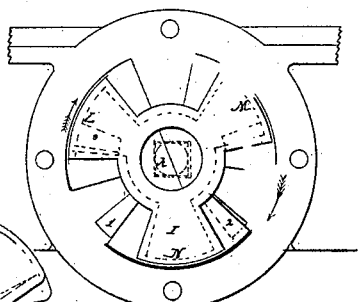
Fig. 10
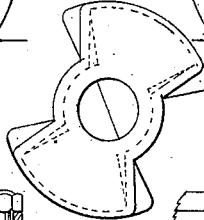
Fig. 14
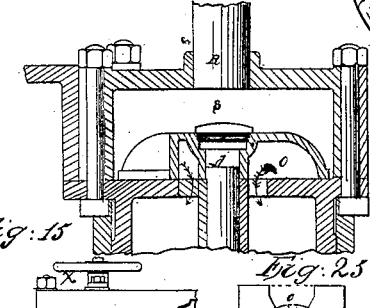
Fig. 11
Fig. 15
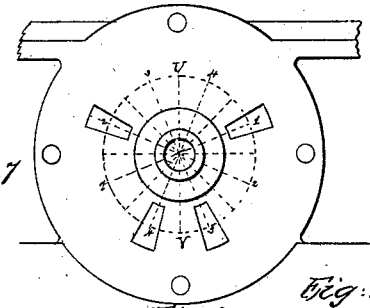
Fig. 13
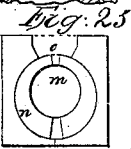
Fig. 25
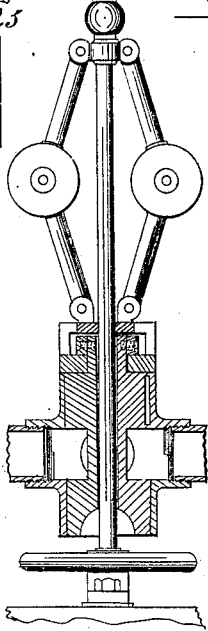
Fig. 27
Fig. 12
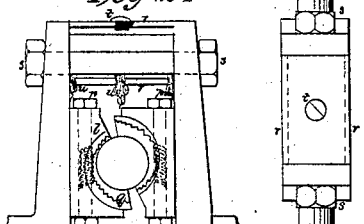
Fig. 24
Fig. 26
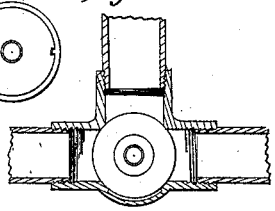
Fig. 29  Fig. 28
Witnesses:
J. E. Ware
Inventor:
R. F. Hatfield

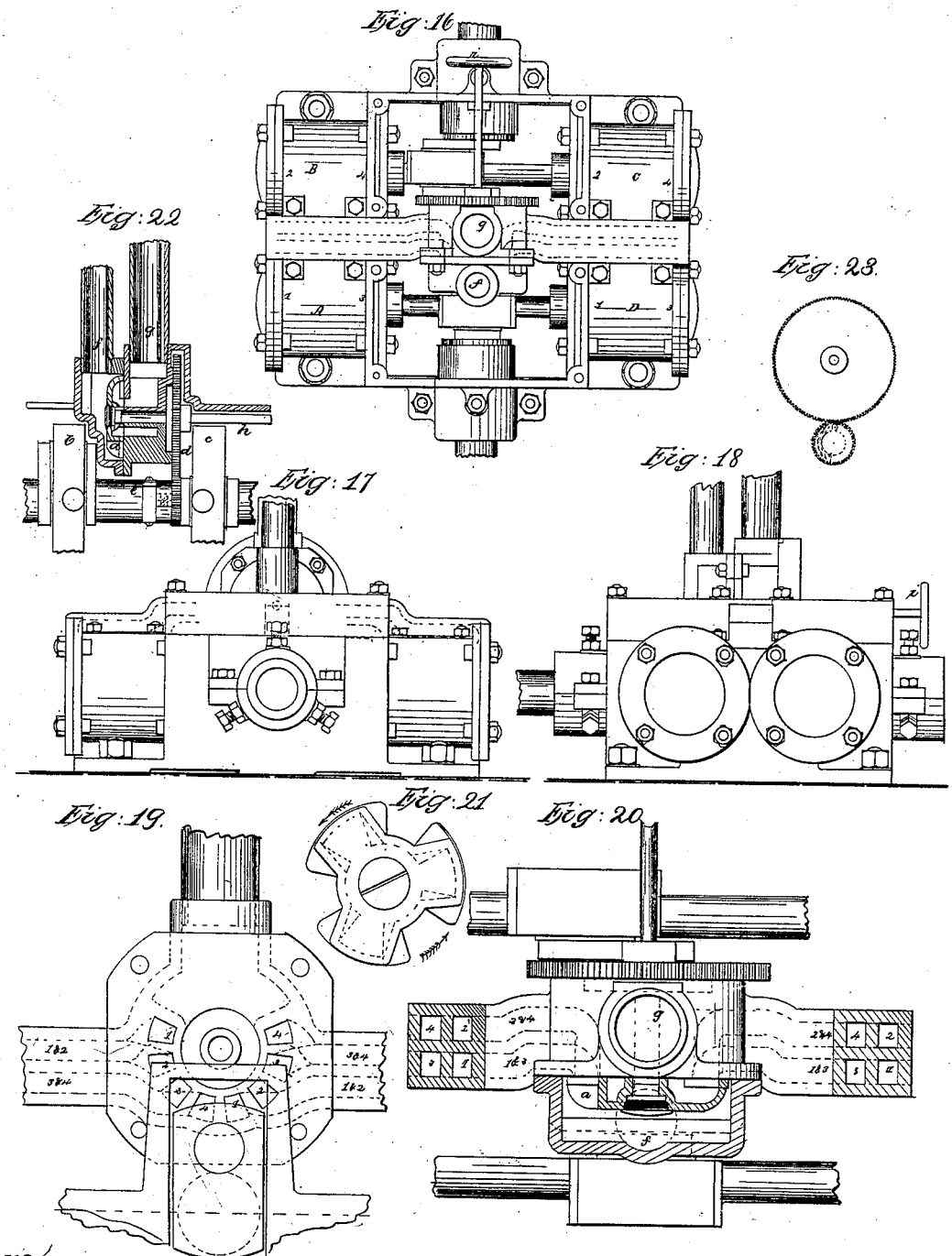

UNITED STATES PATENT OFFICE.

R. FRANCIS HATFIELD, OF NEW YORK, N. Y.

IMPROVEMENT IN STEAM-ENGINES, VALVES, &c.

Specification forming part of Letters Patent No. 56,045, dated July 3, 1866.

*To all whom it may concern:*

Be it known that I, R. FRANCIS HATFIELD, of the city of New York, in the county and State of New York, have invented a new and Improved Steam-Engine; and I do hereby declare that the following is a full, clear, and exact description of the construction and operation of the same, reference being had to the annexed drawings, making a part of this specification.

The nature of my invention consists in introducing the following improvements, namely, first, a rotary steam-valve supplying and exhausting two parallel double-acting cylinders in such a manner as to alternate the supply and exhaust of said cylinders, as required, when the power of both pistons is applied to the same shaft by means of cranks working at right angles to one another, also a like valve working four double-acting cylinders; second, an arrangement of crank-pin brasses working in cross-head slides, made to compensate for wear by means of reversed eccentrics acted upon by screw-bolts in a simple and effective manner; third, a cross-head oil-cup arranged within the top of the cross-head itself, and provided with wicks to supply the slides with oil automatically; fourth, the combination of the above improvements in the manner shown in the drawings, the valve being located either between two cylinders to work both of them or at the center of the engine to work four cylinders, as shown.

To enable others skilled in the art to make and use my improvements, I will proceed to describe their construction and operation.

Figure 6:
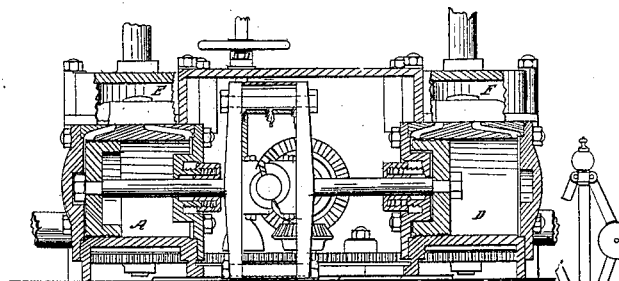
Figure 7:
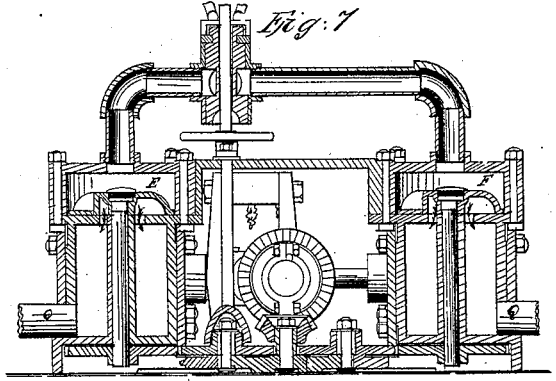
Figure 8:
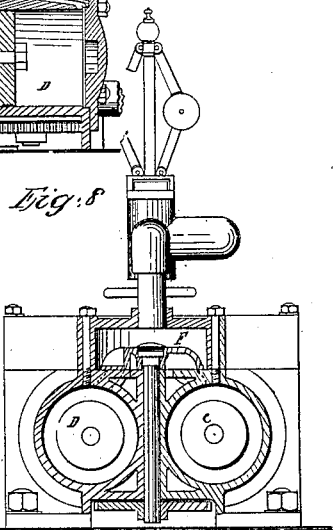

First. I arrange four cylinders in the manner shown in Figure 1 (which is a top view of the engine) at A, B, C, and D, and place one valve at E and one at F. Said cylinders and valves are also shown in Fig. 2, a side view, and Fig. 3, an end view; Fig. 4, a perspective view; Fig. 5, a horizontal section or plan; Fig. 6, a vertical section at right angles to the direction of the shaft through two of the cylinders; Fig. 7, a vertical section in the same direction through the center of the valves, and Fig. 8 a vertical transverse section, also through the center of one of the valves, at right angles to that of Fig. 7.

In an arrangement of cylinders of this kind, where the cranks G and H, Fig. 5, are placed at right angles to one another, the steam is required to be supplied to the cylinders first at 1, second at 2, third at 3, and fourth at 4, Fig. 5, thus alternating between the two cylinders.

At Fig. 9 the seat of the valve is shown at large, and the ports 1, 2, 3, and 4 connect with the cylinders in the same order, respectively, as indicated by 1, 2, 3, and 4 in Fig. 5. In Fig. 10 the same seat is shown with the valve I upon it, placed in the position required to correspond with the position of the pistons I and K, Fig. 5. This valve is constructed with three wings, L, M, and N, the middle part of each of which is swelled up so as to form a chamber beneath, as shown at O, Fig. 11, which is a vertical section through the center of the valve. Through this chamber the exhaust-steam finds its way to the annular opening P, Fig. 9, and so to the exhaust-pipe Q, Fig. 7, through the space between the cylinders.

In Fig. 11, R is the steam-pipe, and S the valve-chest.

By the construction of the valve, Fig. 10, it is seen that the steam is admitted first to the port 1, second to the port 2, third to the port 3, and fourth to the port 4, and the relative exhausts take place in the same order, the valve I making one revolution to three of the shaft, as regulated by the gearing at T, Fig. 12.

I locate the valve-ports 1, 2, 3, and 4, Fig. 9, as follows: I draw the line U V through the center of the valve and parallel with the cylinders. I then divide the periphery of the valve into twenty-four equal parts, as shown by the dotted lines, and locate the first port 1 on the third division from the front of the valve U. Then, commencing at that division, I mark every alternate division around the valve in this order, 1 2 3 4, 1 2 3 4, 1 2 3 4, making three general divisions corresponding with the number of the wings of the valve I, Fig. 10. Then, supposing the valve to rotate from the left to the right, as shown in Fig. 10 by the arrows, I observe the order in which the ports should occur according as they are figured in Fig. 5—namely, 1 3 4 2—selecting the divisions for the ports in Fig. 9 in the same order, 1 3 4 2, and taking those which are so marked and at the same time are the most convenient for the cylinders. I locate the ports upon those divisions, as shown, which also, at the same time, makes the distance between the ports of one cylinder the same as that between the ports of the other. I then make the wings of the valve I, Fig. 10, of sufficient length to cover the two ports 1 and 3, and with one-eighth of an inch lap besides, and make the length of the exhaust-chambers in the wings one-eighth of an inch less than the distance between said ports, and make the said three wings symmetrical in form, which is necessary in order to make it work properly when the engine is reversed.

In Figs. 13 and 14 are shown the seat and valve so arranged as to make one revolution to two of the shaft, where the same principles are applied in laying out the ports and determining the form of the valve as in Figs. 9 and 10, the line U V being taken parallel to the cylinders, (in this case U being the front of the valve,) and the general divisions on the valve-seat being two in number, thus, 1 2 3 4, 1 2 3 4, and the order of the ports being 1 3 4 2, as before.

The valve, Fig. 14, in this case requires but two wings, the size of which is determined in the same manner as in the previous case. Thus the divisions on the seat in the case of three wings are twenty-four, and in the case of two wings sixteen, and the first port is placed upon the third division from U. If four wings should be used, the number of divisions would be thirty-two.

To reverse the engine I shut off the steam and turn the valve I, Fig. 10, one-sixth of a revolution back, which reverses the supply and exhaust in each port. This is done by means of the spindle W, Fig. 15, operated by the hand-wheel X, which moves the gear the distance indicated by the slot Y, in which is placed the pin Z, attached to the crank-arm.

The valve above described is intended to work two double-acting cylinders; but I also propose to apply essentially the same valve to the working of four double-acting cylinders, as shown at Fig. 16 and the other figures on that sheet. In this case I place the valve $a$, Fig. 22, at the center of the engine, over the shaft $e$, and between the two crank cross-heads $b$ and $c$, and operate it by the gearing $d$, regulated to give one revolution of the valve to three of the shaft, introducing the steam at $f$ and exhausting at $g$, and reversing by means of the spindle $h$, operated by the hand-wheel $i$. (Shown in Figs. 16 and 18.) This valve, Fig. 21, is also made with three wings, and the valve-seat, Fig. 19, is divided into three general divisions, each subdivided into four subdivisions, and the eight ports are located on the eight lower subdivisions, as shown.

On the left-hand side of the valve, Fig. 19, the ports 1 and 2 supply the far ends of the cylinders, and 3 and 4 supply the near ends, as indicated at 1, 2, 3, and 4, Fig. 16, and on the right-hand side of the valve the ports 1 and 2 supply the near ends of the cylinders, and 3 and 4 supply the far ends. A horizontal section through this valve is shown at Fig. 20.

Second. To compensate for the wear of the crank-pin brasses L and $q$, Fig. 24, I construct the same in four pieces, as shown at Fig. 25, cutting the opening $m$ for the crank-pin eccentric to the circle $n$, that bounds the interior pieces, and making the exterior pieces to fit the circle $n$. I then cut out the superfluous metal at $o$, &c., and reverse their position, as shown at Fig. 24. I drill holes through the exterior pieces and insert bolts loosely therein, as at $p\ p'$, Figs. 24 and 5. I work a screw-thread upon the bolts, and, forming a semicircular channel in the periphery of the inside pieces from $l$ to $q$, I work a corresponding thread in that also. Thus, by turning the bolt $p\ p'$ the inside brass, $l\ q$, is raised and the outside brass thrown out, and so made to compensate for any wear either on the slide or crank-pin that it may have undergone.

Third. Another improvement consists in forming the upper part of the cross-head over the crank-pin into an oil-cup, as shown in Figs. 24 and 26. I construct said part of the cross-head $r\ r$ hollow and open at the ends. I then plane off the ends perfectly even and insert the cross-head bolt $s\ s$, passing through the same, which, when tightened up, makes a tight chamber. At $t$, I make an opening for the purpose of supplying it with oil, closing with a screw-cap, and at $u\ u\ u$, I make small round openings in the bottom of the cup and insert ordinary lamp-wick therein, as shown. I adjust the length of this wick so that every time the crank rises the crank-pin brasses will touch the wicks and take therefrom a drop of the oil. In this way a continuous automatic lubricator is provided.

Fourth. The relative arrangement and combination of the several parts of the engine is also an improvement, giving great compactness and all the simplicity and economy of parts desirable and at the same time consistent with permanency and efficiency. The valves are worked with simple gearing, and all the parts inclosed in a tight iron case, as shown. Where the two valves are used and the reversing-spindle is upright the governor is arranged to be located upon an extension of said spindle, as shown at Figs. 27, 28, and 29. In the case where the reversing-spindle is horizontal the ordinary arrangement of taking the governor-belt from the shaft is to be adopted.

I claim—

1. A rotary valve arranged to supply alternately the ports of two or four double-acting cylinders, as required, when the shaft-cranks are placed at right angles to one another, substantially as shown and described.

2. The rotary valve I, Fig. 10, constructed with two or more wings, as shown at Figs. 10, 14, and 21, in connection with the arrangement of the ports 1, 2, 3, and 4, Figs. 9, 13, and 19, substantially as described, and for the purpose specified.

3. The crank-pin brasses $l$ and $q$, Fig. 24, in combination with the screw-bolts $p$ $p'$ and the screw-channel in the piece $q$, substantially as described, and for the purpose set forth.

4. Arranging the upper part, $r$ $r$, Fig. 24, of the crank cross-head to serve as an oil-cup, in combination with the supply-wicks $u$ $u$ $u$, substantially as shown.

5. The combination of the above several improvements, as shown by the drawings.

R. F. HATFIELD. [L. S.]

Witnesses:
I. S. REMER,
J. E. WARE.